(12) United States Patent
Yamamoto

(10) Patent No.: US 7,415,168 B2
(45) Date of Patent: Aug. 19, 2008

(54) IMAGE READING DEVICE

(75) Inventor: Shinobu Yamamoto, Kahoku (JP)

(73) Assignee: PFU Limited, Ishikawa (JP)

( * ) Notice: Subject to any disclaimer, the term of this patent is extended or adjusted under 35 U.S.C. 154(b) by 673 days.

(21) Appl. No.: 10/527,984

(22) PCT Filed: Sep. 26, 2003

(86) PCT No.: PCT/JP03/12313

§ 371 (c)(1),
(2), (4) Date: Mar. 21, 2005

(87) PCT Pub. No.: WO2004/032482

PCT Pub. Date: Apr. 15, 2004

(65) Prior Publication Data

US 2006/0044575 A1    Mar. 2, 2006

(30) Foreign Application Priority Data

Oct. 4, 2002    (JP)    ............... 2002-292007

(51) Int. Cl.
*G06K 9/36*    (2006.01)
(52) U.S. Cl. .................. 382/289; 382/296; 345/659
(58) Field of Classification Search .......... 73/1.75; 345/649, 659, FOR. 146, FOR. 218; 360/76; 382/289, 296; 399/395; 400/579; 714/700
See application file for complete search history.

(56) References Cited

U.S. PATENT DOCUMENTS 3,920,889 A * 11/1975 Connor ................. 348/625
5,940,128 A    8/1999 Morimura
6,384,414 B1 * 5/2002 Fisher et al. .......... 250/339.14

FOREIGN PATENT DOCUMENTS

| JP | 5-344318 | 12/1993 |
|---|---|---|
| JP | 11-252351 | 9/1999 |
| JP | 2000-261653 | 9/2000 |
| JP | 2000-341501 | 12/2000 |
| JP | 2002-142084 | 5/2002 |

* cited by examiner

*Primary Examiner*—Matthew C. Bella
*Assistant Examiner*—Gregory F Cunningham

(57) ABSTRACT

An image reading apparatus has a data calculation unit (31, 32) to calculate moving average data and second derivative data for a plurality of samples made of multivalued data, a position detection unit (41, 42) to detect first and second positions at which the moving average data and second derivative data have a predetermined relationship, a parallel region determination unit (5) to determine a parallel region based on the first and second positions, an inclination detection unit (61 to 64) to determine inclinations based on the parallel region, and an inclination detection unit (7) to correct image data based on the inclinations.

9 Claims, 11 Drawing Sheets

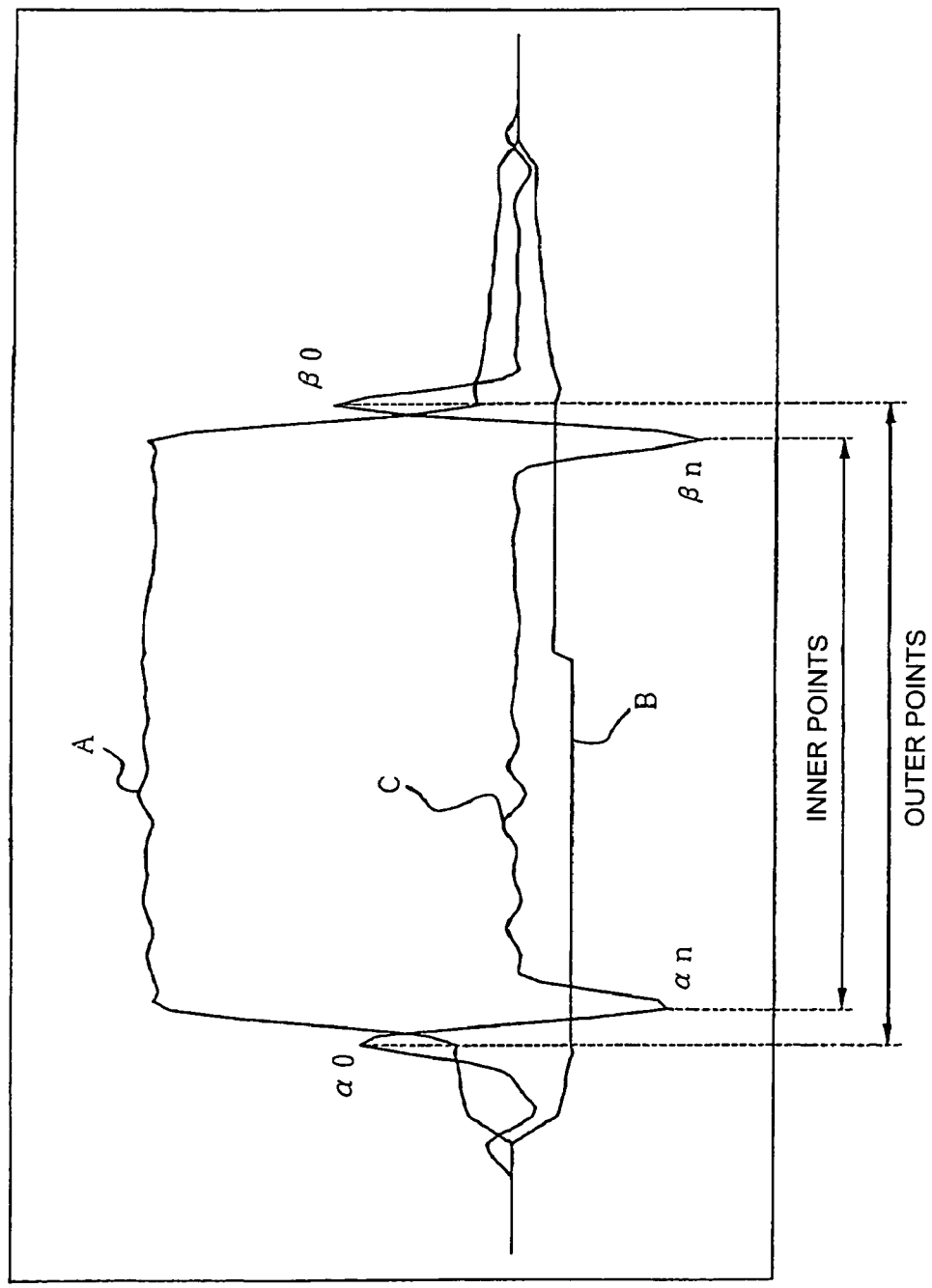

FIG. 7A
| POSITION | OUTER POINT 0/n | | INNER POINT 0/n | |
|---|---|---|---|---|
| 0 | $\alpha 0$ | $\beta 0$ | $\alpha n$ | $\beta n$ |
| ⋮ | ⋮ | ⋮ | ⋮ | ⋮ |
| ⋮ | ⋮ | ⋮ | ⋮ | ⋮ |
| ⋮ | ⋮ | ⋮ | ⋮ | ⋮ |
| n | $\alpha 0$ | $\beta 0$ | $\alpha n$ | $\beta n$ |
421
FIG. 7B
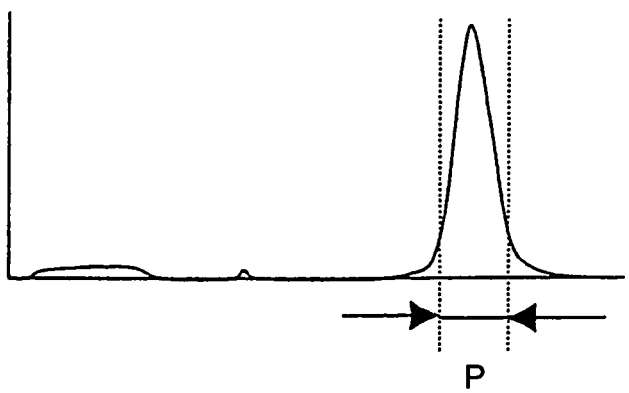
P
FIG. 7C
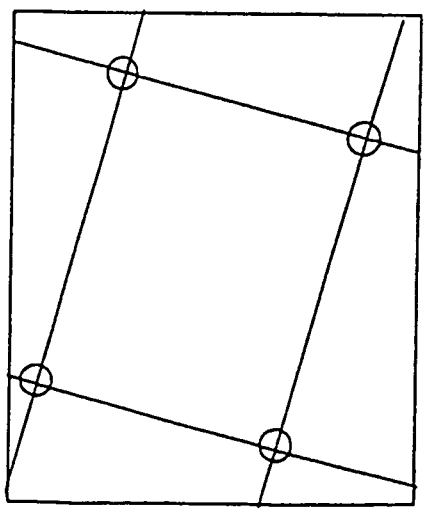

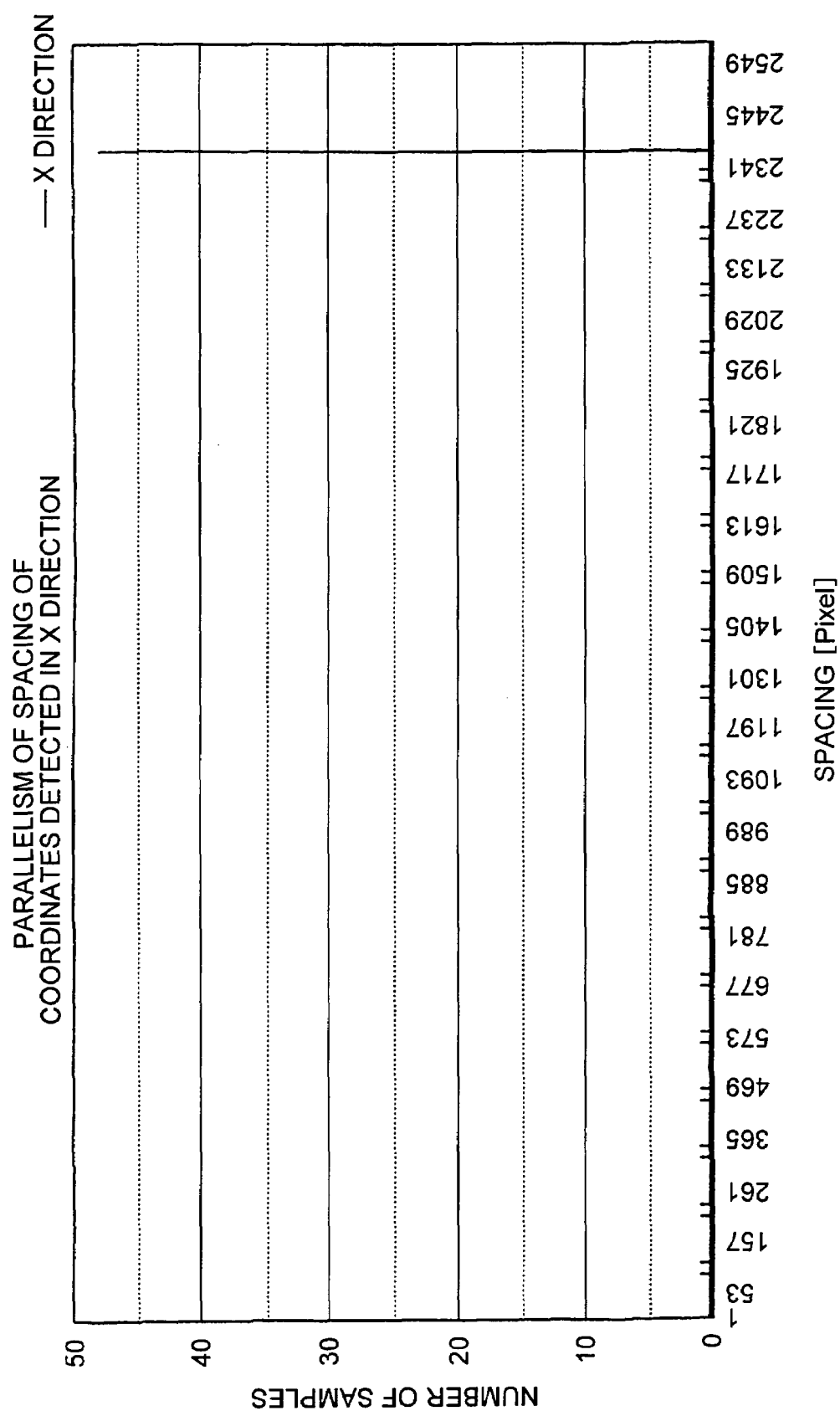

IMAGE READING DEVICE

This application claims the benefit of POT International Application Number PCT/JP03/012313 filed Sep. 26, 2003 and Japanese Application No. 2002-292007, filed Oct. 4, 2002, in Japan, the disclosures of which are incorporated herein by reference.

1. Technical Field

This invention relates to an image reading apparatus, and more particularly relates to an image reading apparatus which detects the inclination of a read color image or multivalued image and corrects the image without a deterioration of image quality.

2. Background Art

In an image reading apparatus such as an image scanner, when the user does not correctly place a document on a platen glass (FB), read image data is tilted. Also when the user does not correctly set a document on a document feeder (ADF), read image data is tilted in a similar manner. This state frequently occurs particularly by placing a document in a tilted manner, for example, when a B5-size document is placed on an A4-size platen glass.

Such tilted image data can be corrected by, for example, an edit processing such as a rotation processing. However, such an edit processing requires a long processing time and is not suitable for high speed processing. Then, a technique is proposed to detect an inclination (angle) and correct image data without the edit processing (e.g., Japanese Patent Laid-Open No. 2002-142084 (pages 3 to 12)).

The conventional detection of an inclination of image data is applicable when the image data is binary data. This is because the inclination correction assumes that an image scanner is mainly intended to read text documents. That is, the inclination correction technique is accepted for correcting the inclination of characters represented by binary data and making the outputted data easy to read.

Therefore, when the image data is (full) color data and multivalued data (gray scale), the image data is temporarily converted into binary data and then the inclination of the image data is detected. Thus, an image obtained after correcting the inclination of a color image or a multivalued image may decline in image quality, for example, the edge of a portrait may be jagged in a picture due to the conversion of the image data.

In recent years, color image scanners have become prevalent and thus there are many cases that an image to be processed is color images or multivalued images which includes pictures. Then, it is desired to detect the inclination (angle) of a color image or a multivalued image and correct the image data without an edition processing such as a rotation processing which needs a long processing time and without a deterioration of quality of pictures.

It is an object of the present invention to provide an image reading apparatus which detects the inclination of a read color image or multivalued image and corrects the image without a deterioration of image quality.

DISCLOSURE OF INVENTION

An image reading apparatus of the present invention has a data calculation unit to calculate moving average data and second derivative data for a plurality of samples made of multivalued data, the plurality of samples being data in a vertical direction and a horizontal direction in reading an inputted image data, a position detection unit to detect first and second positions at which the moving average data and second derivative data have a predetermined relationship based on the moving average data and second derivative data, for each of the plurality of samples, a parallel region determination unit to determine a parallel region based on the first and second positions detected for each of the plurality of samples, an inclination detection unit to determine inclinations of four sides of the inputted image based on the determined parallel region, and an inclination detection unit to correct the inputted image data based on the detected inclinations.

According to the image reading apparatus of the present invention, a parallel region is determined by using a plurality of samples made of multivalued data, the inclinations of the four sides of the image are determined based on the parallel region, and inputted image data is corrected. Thus, even when the input image data is multivalued data or color data, it is possible to correct the inclination of the image data without a conversion into binary data. Therefore, it is possible to prevent a deterioration of image quality that is caused by the conversion of the image data. Consequently, for example, it is possible to correct the inclination of image data read by a color image scanner without an edit processing such as a rotation processing which needs a long processing time and without causing a deterioration of image quality in pictures, for example.

BRIEF DESCRIPTION OF DRAWINGS

FIG. 6 is an explanatory drawing showing the correction of image inclination.

FIGS. 7A, 7B, and 7C are explanatory drawings for explaining the correction of image inclination.

FIG. 8 is an explanatory drawing showing the correction of image inclination.

BEST MODE FOR CARRYING OUT THE INVENTION

Figure 1:
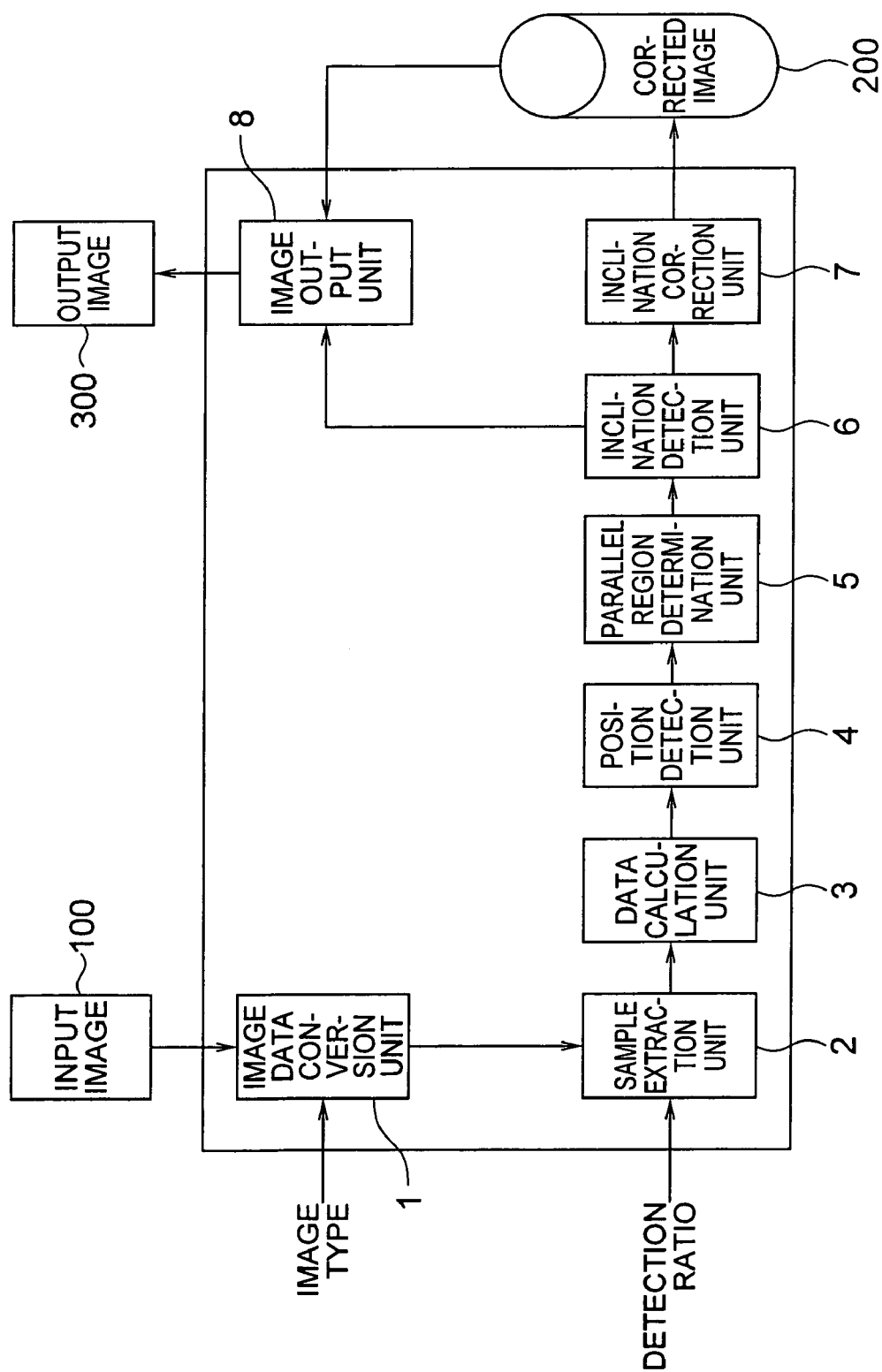
FIG. 1 is a structural diagram of an image reading apparatus that schematically shows the configuration of the image reading apparatus.
Figure 2:
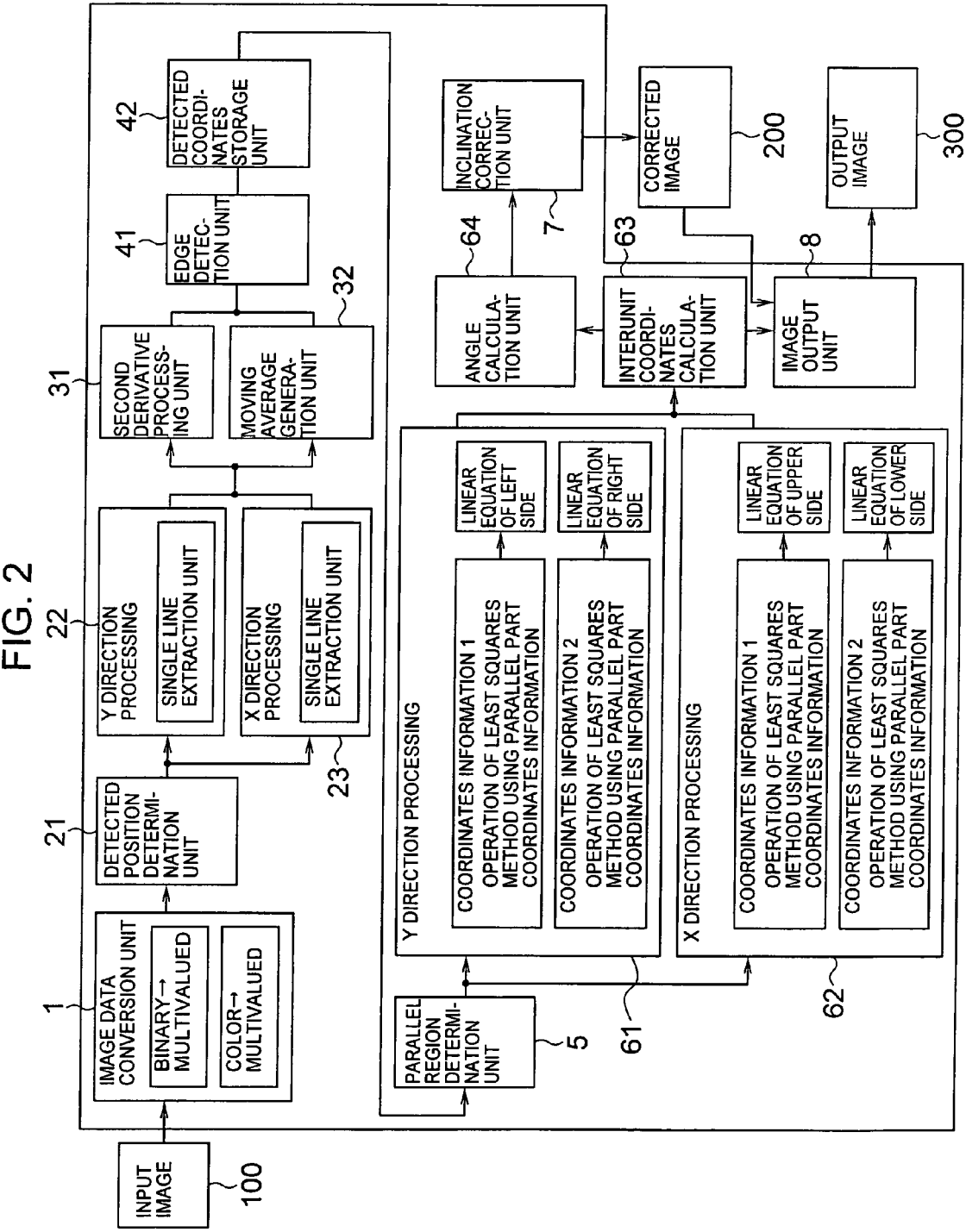
FIG. 2 is a structural diagram of the image reading apparatus that shows the configuration of the image reading apparatus in detail.

FIGS. 1 and 2 are structural diagrams showing an image reading apparatus. To be specific, FIG. 1 schematically shows the configuration of the image reading apparatus according to the present invention, and FIG. 2 shows the detail of the configuration of the image reading apparatus shown in FIG. 1.

When image data (hereinafter referred to as an input image) 100 is inputted, an image data conversion unit 1 performs processing on the input image 100 according to a designated image type. The image type is designated by, for example, the user who specifies a reading type of a color, multivalued, or monochrome (binary) image. When the image type is a multivalued image, the image data conversion unit 1 transmits the input image 100 as it is to a sample extraction unit 2. When the image type is a color image or a binary image, the image data conversion unit 1 converts the image data and then transmits the data to the sample extraction unit 2. That is, for example, 8-bit multivalued image data (256 scales) is generated based on 24-bit full-color image data. Alternatively, 8-bit multivalued image data is generated based on 1-bit binary image data. In this case, "0 (or black)" serves as 0 scale and "1 (or white)" serves as 255 scale. Therefore, prior to the extraction of a sample, the input image 100 is converted into multivalued image data.

Figure 3:
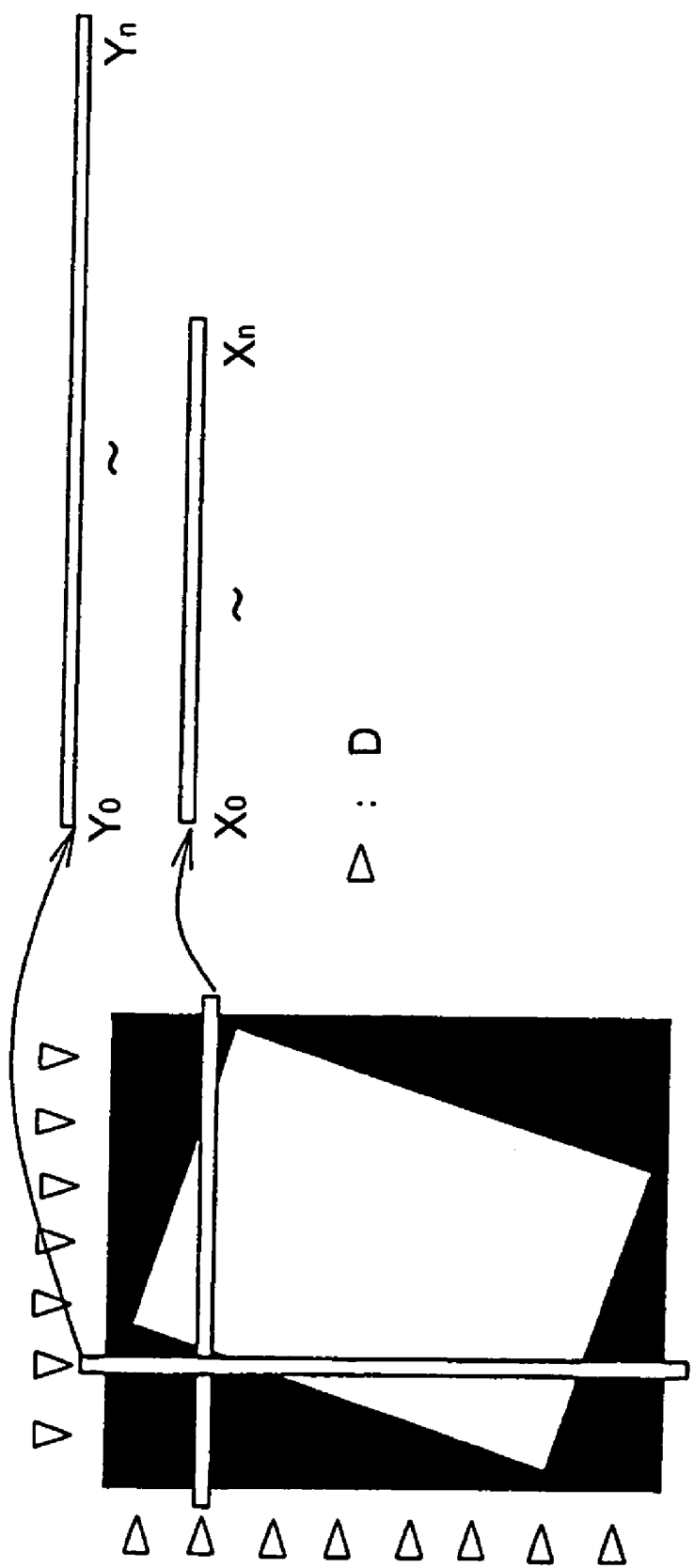
FIG. 3 is an explanatory drawing showing the correction of image inclination.

The sample extraction unit 2 comprises a detected position determination unit 21, a single line extraction unit 22 for performing processing on the y direction, and a single line extraction unit 23 for performing processing on the x direction. As shown in FIG. 3, the y direction is a sub-scanning direction and is the vertical direction in reading. Further, the x direction is a main scanning direction and is the horizontal direction in reading. In FIG. 3, since a sheet is placed in a tilted manner, it is shown that a white sheet is read in a tilted manner in a reading region shown in black.

When the detected position determination unit 21 receives multivalued image data from the image data conversion unit 1, the detected position determination unit 21 determines positions to extract samples according to a detection ratio (extraction ratio). The detection ratio is specified at, e.g., 5% from the outside of the image reading apparatus. For example, when the x direction has 2500 lines (reading lines or pixel lines), 125 samples are extracted which are equivalent to 5% of the lines. Thus, the detected position determination unit 21 determines that a sample is detected every 20 (=2500/125) lines. The detected position determination unit 21 determines the same regarding the y direction. Therefore, the positions (detection target positions D) at which samples are extracted are made at equal intervals as indicated by white triangles in FIG. 3 and the extraction positions are determined by a ratio of scans in the x direction and the y direction. Samples in the x direction have pixels x0 to xn and samples in the y direction have pixels y0 to yn.

Thus, 100 to 130 samples are normally obtained in each of the vertical and horizontal directions, though the number of samples is actually varied by a resolution. The number of samples is enough to detect an inclination. Further, when the accuracy of detecting an inclination is increased, the number of samples (i.e., a detection ratio %) is increased. In this case, processing speed is somewhat reduced. When the processing speed is increased, the number of samples is reduced. In this case, the accuracy of detecting inclination is somewhat reduced.

When the single line extraction unit 22 receives the multivalued image data from the detected position determination unit 21, the single line extraction unit 22 extracts a plurality of samples in the vertical reading direction (y direction) from the multivalued image data and transmits the samples to a data calculation unit 3. As shown in FIG. 3, the samples comprise data which corresponds to one reading line (one line of pixels). That is, the data is multivalued data which is obtained from image data of the one reading line of the input image 100. In this example, the positions at which samples are extracted are on 20, 40, 60, . . . lines according to the determination of the detected position determination unit 21. Similarly when the single line extraction unit 23 receives multivalued image data from the detected position determination unit 21, the single line extraction unit 23 extracts a plurality of samples in the horizontal direction (x direction) from the multivalued image data and transmits the samples to the data calculation unit 3.

The data calculation unit 3 comprises a second derivative processing unit 31 and a moving average generation unit 32. When the second derivative processing unit 31 receives a plurality of samples from the single line extraction units 22 and 23, the second derivative processing unit 31 calculates second derivative data for each of the samples in the vertical and horizontal directions and transmits the data to a position detection unit 4. Further, when the moving average generation unit 32 receives a plurality of samples from the single line extraction units 22 and 23, the moving average generation unit 32 calculates moving average data for each of the samples in the vertical and horizontal directions and transmits the data to the position detection unit 4. That is, in each of the samples, each pixel has any one of values of 0 to 255 of 8-bit multivalued data (256 scales). Then, by differentiating the multivalued data twice, the second derivative data is obtained. Moreover, the moving average data is obtained by performing a well-known processing on the multivalued data. For example, a moving average data is obtained as follow: Aven= $((n-2)+2(n-1)+4n+2(n+1)+(n+2))/10$. That is, mutivalued data enables differentiation and the calculation of moving average.

Figure 4:
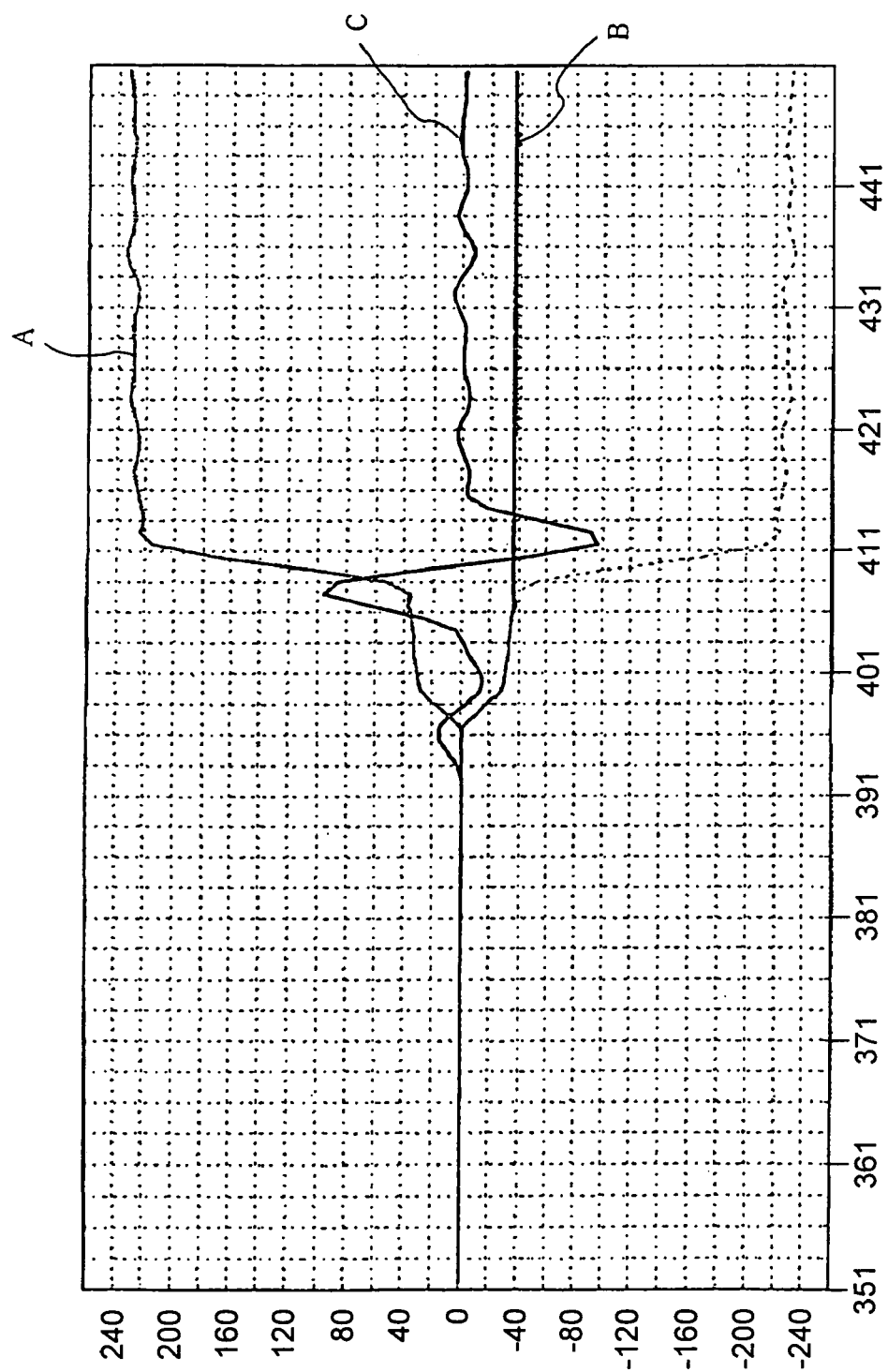
FIG. 4 is an explanatory drawing showing the correction of image inclination.
Figure 5:
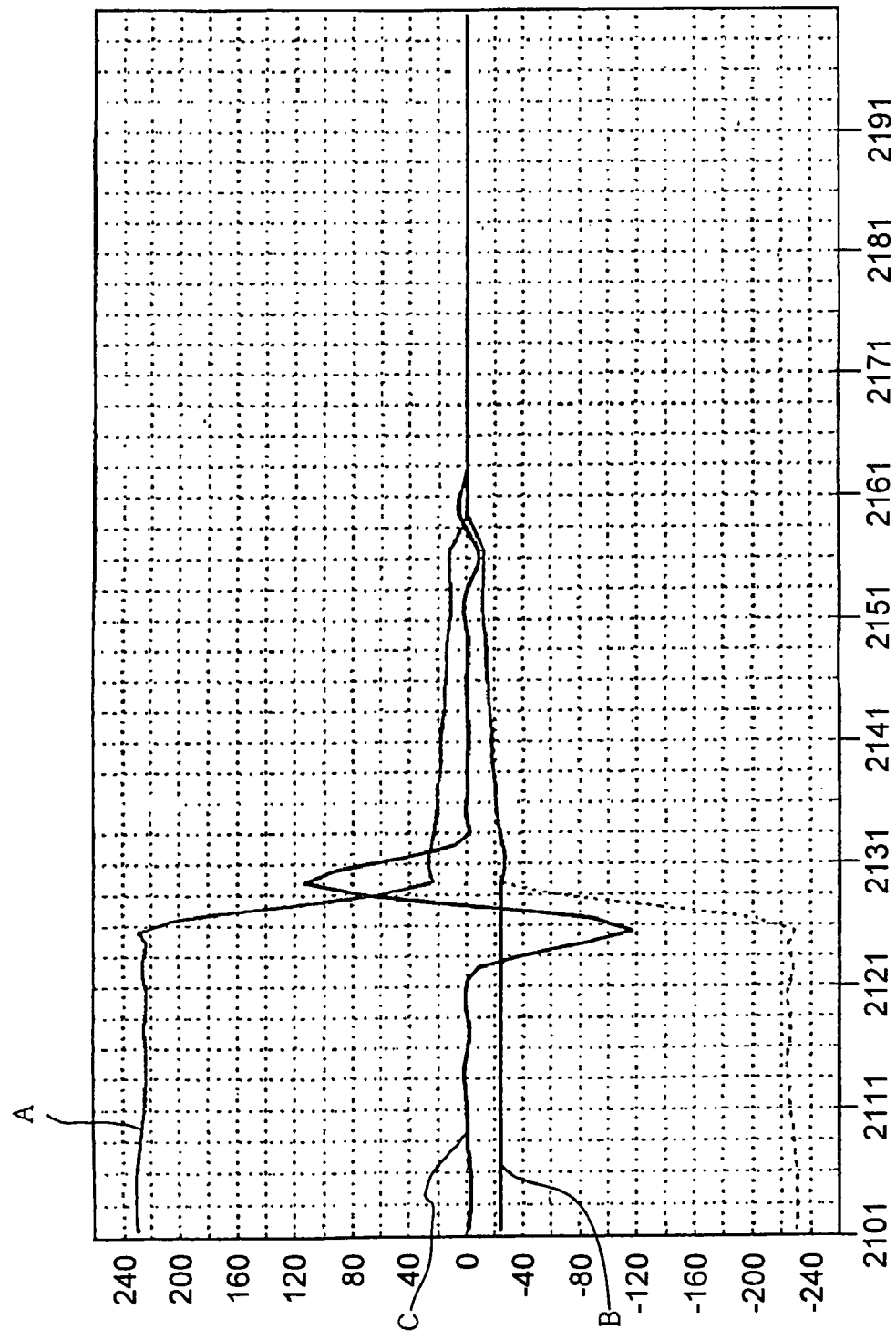
FIG. 5 is an explanatory drawing showing the correction of image inclination.

FIGS. 4 to 6 show examples of the second derivative data and moving average data. In FIGS. 4 to 6, a curve A represents moving average data Aven. A curve B represents data obtained by reversing the polarity of the moving average data Aven, and by replacing a section between two points where the maximum second derivative data (curve C) has the maximum value in the data obtained by the reversing, with a value obtained by reversing the polarity of a value a of the moving average data Aven on the points where the second derivative data (curve C) has the maximum value. And, a curve C represents the second derivative data. Besides, the data of the curve B does not actually exist as data based on read data, but is generated for the detection of positions (described later) in the present invention.

For example, FIG. 4 corresponds to the left part of the samples extracted in the x direction of FIG. 3. Regarding the moving average data Aven (curve A), since the sheet (white part) is placed in a tilted manner, at the beginning, regions having pixel values of 0 scale are consecutively provided, due to the absence of the sheet. Then, at the edge of the sheet, the pixel value rapidly increases to such a value of about 235 scales (thus, the sheet is not completely white). Additionally, the second derivative data (curve B) is varied according to a change in pixel value as shown in FIG. 3 and a similar curve is obtained in the y direction (also same in FIGS. 5 and 6).

Conversely, FIG. 5 corresponds to the right side of the samples extracted in the x direction of FIG. 3. That is, regarding the moving average data Aven (curve A), since the sheet is placed in a tilted manner, at the beginning, regions having pixel values of about 235 scales are consecutively provided, due to the presence of the sheet. Then, at the edge of the sheet, the pixel value rapidly decreases and becomes almost values of 0 scale.

FIG. 6 is obtained by combining FIGS. 4 and 5 and schematically shows the second derivative data and moving average data when the sheet is placed in a tilted manner. That is, when the sheet is placed in a tilted manner, the curves shown in FIG. 6 are always obtained. For example, regarding the moving average data Aven (curve A) of one example, regions having pixel values of 0 are consecutively provided at the beginning due to the absence of the sheet, and the pixel value rapidly rises at the edge of the sheet. Thereafter, regions having pixel values of about 235 are consecutively provided due to the presence of the sheet, and the pixel value rapidly decreases to almost 0 at the edge of the sheet.

The position detection unit 4 comprises an edge detection unit 41 and a detected coordinates storage unit 42. When the edge detection unit 41 receives the moving average data and second derivative data of each of the plurality of samples from the second derivative processing unit 31 and the moving average generation unit 32, the edge detection unit 41 detects first and second positions where the data has a predetermined relationship based on the received data, and transmits the positions to the detected coordinates storage unit 42. The first and second positions correspond to the edges of the sheet.

As shown in FIG. 6, the edge detection unit 41 determines points, on which the second derivative data has the maximum value and has a value larger than the moving average data, as a first position $\alpha 0$ and a second position $\beta 0$. These points will be referred to as outer points. Besides, the position at which the pixel value rapidly increases is designated as the first point $\alpha$, and the position at which the pixel value rapidly decreases is designated as the second position $\beta$. On the positions at which the pixel value rapidly increases or decreases, the second derivative data always has the maximum value and has a value larger than the moving average data. Therefore, it can be assumed that the positions, on which the second derivative data has the maximum value and has a value larger than the moving average data, correspond to the edges of the sheet.

Further, as shown in FIG. 6, the edge detection unit 41 determines points, on which the second derivative data has the minimum value and has a value smaller than a value obtained by reversing the polarity of a value of the moving average data on the point having the second derivative data of the maximum value, as a first position $\alpha n$ and a second position $\beta n$. These points will be referred to as inner points (points inside relative to the outer points). On the point at which the pixel value rapidly increases or decreases, the second derivative data always has the minimum value and has the value smaller than the value obtained by reversing the polarity of a value of the moving average data on the point at which the second derivative data has the maximum value. Therefore, it can be assumed that the positions, on which the second derivative data has the minimum value and has the value smaller than the value obtained by reversing the polarity of a value of the moving average data on the point at which the second derivative data has the maximum value, correspond to the edges of the sheet. Only the outer points may be determined without determining the inner points. Conversely, only the inner points may be determined without determining the outer points.

As shown in FIG. 7A, the detected coordinates storage unit 42 creates a detected coordinates table 421. The detected coordinates table 421 stores unique numbers assigned to each of the plurality of samples, and the outer points and inner points detected from the samples in the edge detection unit 41. When the detected coordinates storage unit 42 stores the outer points and inner points of all of the plurality of samples, the detected coordinates storage unit 42 notifies a parallel region determination unit 5 of the storing.

When the parallel region determination unit 5 receives the notification from the detected coordinates storage unit 42, the parallel region determination unit 5 determines a parallel region based on the first and second positions detected on each of the plurality of samples, and notifies an inclination detection unit 6 of the result (position coordinates).

For this determination, the parallel region determination unit 5 refers to the detected coordinates table 421, and subtracts the first position $\alpha 0$ (coordinate value) from the second position $\beta 0$ (coordinate value) of the outer points, so that a distance between the first and second positions is calculated (FIG. 6). Alternatively, by subtracting the first position an (coordinate value) from the second position $\beta n$ (coordinate value) of the inner points, a distance between the first and second positions is calculated. When the calculated distance becomes almost constant, the distance between the first and second positions is equivalent to the width of the sheet. At this point, as shown in FIG. 6, the calculated sheet width tends to be large when using the outer points, and the sheet width tends to be small when using the inner points. Thus, an average of the distance between the first and second positions of the outer points and the distance between the first and second positions of the inner points may be used as a distance between the first and second positions of the sample. It depends on an instruction inputted by the user from the outside of the image reading apparatus to use which way to determine the distance.

Subsequently the parallel region determination unit 5 determines a distribution (or histogram) of the distances between the first and second positions.

Figure 9:
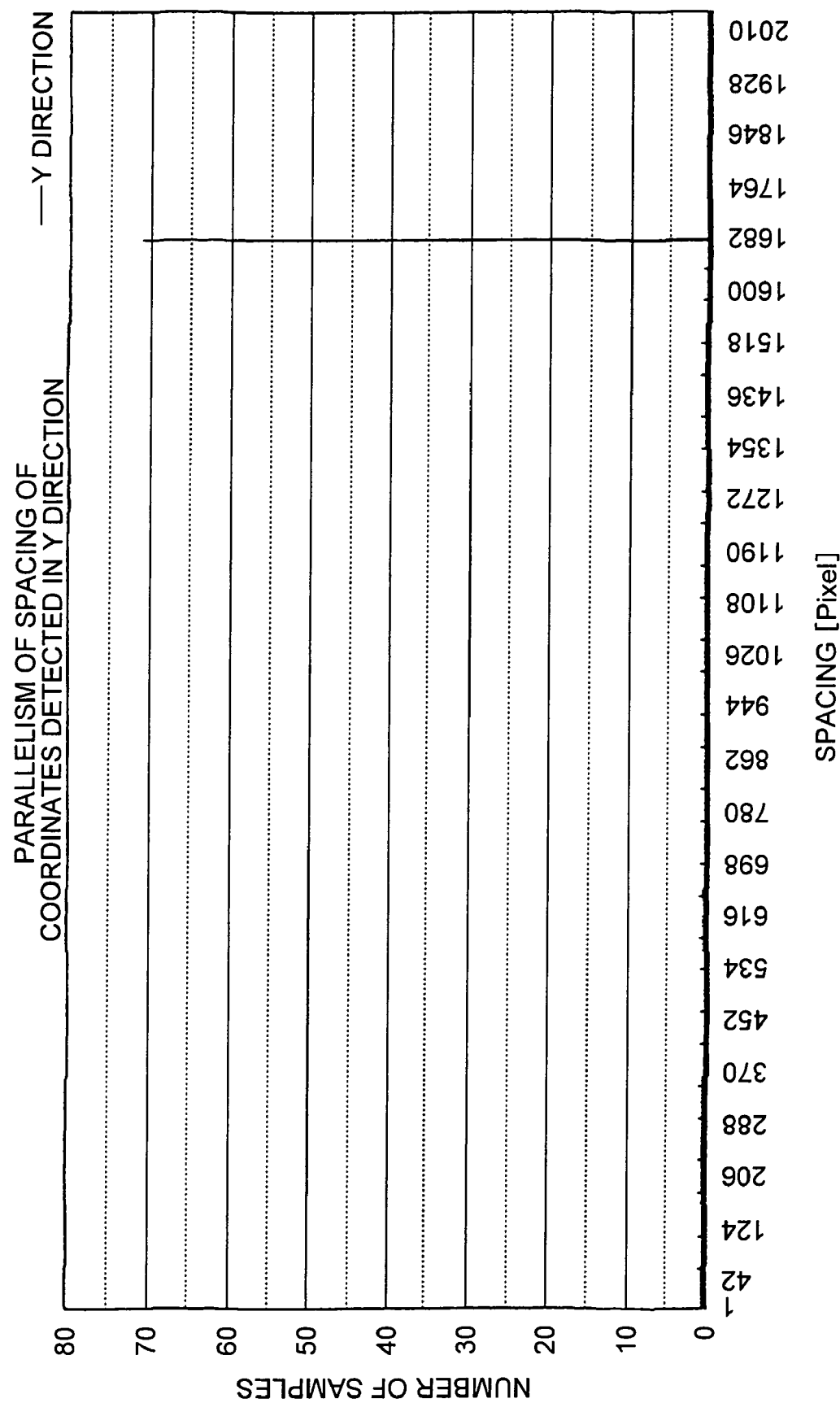
FIG. 9 is an explanatory drawing showing the correction of image inclination.

FIGS. 8 and 9 show examples of distributions of the distances between the first and second positions. FIG. 8 shows a distribution of the distances between the first and second positions of the plurality of samples in the x direction (horizontal direction in reading). In this example, it is found that many samples have distances around 2380, and thus the distances of about 2380 pixels are mainly distributed. FIG. 9 shows the distribution of the distances between the first and second positions of the plurality of samples in the y direction (vertical direction in reading). In this example, it is found that many samples have distances around 1680, and thus the distances of about 1680 pixels are mainly distributed.

As shown in FIG. 7B, normally, the histogram of the distances between the first and second positions is distributed with a certain width. Then, the parallel region determination unit 5 determines the above distribution width as a parallel recognition region P. That is, a parallel region is determined. For example, the distribution width is determined by adding or subtracting a predetermined value to or from the median value of the distribution. To be specific, the parallel region determination unit 5 determines the distribution width as the parallel recognition region P based on the distribution regarding the vertical direction in reading, thereby the parallel region is determined. Further, the parallel region determination unit 5 determines the distribution width as the parallel recognition region P based on the distribution regarding the horizontal direction in reading, thereby the parallel region is determined.

When the inclination detection unit 6 receives the determined parallel region from the parallel region determination unit 5, the inclination detection unit 6 determines the inclinations of the four sides of the inputted image based on the parallel region. For this determination, the inclination detection unit 6 comprises a linear equation unit 61 for performing processing in the y direction, a linear equation unit 62 for performing processing in the x direction, an intersection coordinates calculation unit 63, and an angle calculation unit 64.

When the linear equation unit 61 receives a parallel region of the y direction, as shown in FIG. 7C, the linear equation unit 61 determines the linear equations of two sides (left side and right side) in the y direction of the image. For this determination, the linear equation unit 61 refers to the detected coordinates table 421, and extracts a plurality of samples in the y direction, each of which has a distance between the first and second positions existing in a range of the parallel region of the y direction (only). Then, by using the coordinates of the first positions of the plurality of samples, the linear equation unit 61 determines a linear equation according to the method of least squares well known. This equation is the linear equation of the left side. Further, by using the coordinates of the second positions of the plurality of samples, the linear equation unit 61 determines a linear equation according to the method of least squares well known. This equation is the linear equation of the right side.

Similarly, as shown in FIG. 7C, when the linear equation unit 62 receives a parallel region of the x direction, the linear equation unit 62 determines the linear equations of two sides (the upper and lower sides) in the x direction of the image. That is, the linear equation unit 61 extracts a plurality of samples in the x direction, each of which has a distance between the first and second positions existing in a range of the parallel region of the x direction. By using the coordinates of the first and second positions of these samples, the linear equation unit 61 determines the linear equation of the upper side and the linear equation of the lower side according to the method of least squares well known.

As shown in FIG. 7C, by using the linear equations of the four sides from the linear equation units 61 and 62, the intersection coordinates calculation unit 63 determines the intersections (indicated by white circles) of the four sides as the four apexes of the image which are inclined. As is understood from FIG. 7C, the apexes are determined by solving simultaneous equations. The intersection coordinates calculation unit 63 notifies the angle calculation unit 64 and an image output unit 8 of the determined four apexes.

Figure 10A:
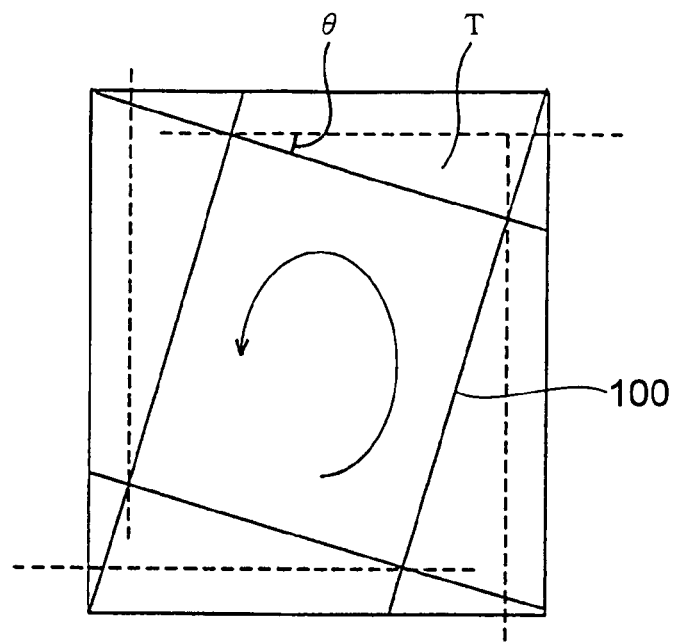
FIGS. 10A and 10B are explanatory drawings showing the correction of image inclination.

As shown in FIG. 10A, the angle calculation unit 64 determines the inclinations of the four sides of the image based on the four apexes, and transmits the inclinations to an inclination correction unit 7 and the image output unit 8 (not shown). As is understood from FIG. 10A, for example, an inclination $\theta$ is obtained by determining the $\tan^{-1}\theta$ of a triangle T. The $\tan^{-1}\theta$ is obtained by solving simultaneous equations from a linear equation represented by a dotted line of FIG. 10A. The linear equation represented by the dotted line is obtained based on the coordinates of two apexes included in the triangle T. The other inclinations are determined in a similar manner.

Figure 10B:
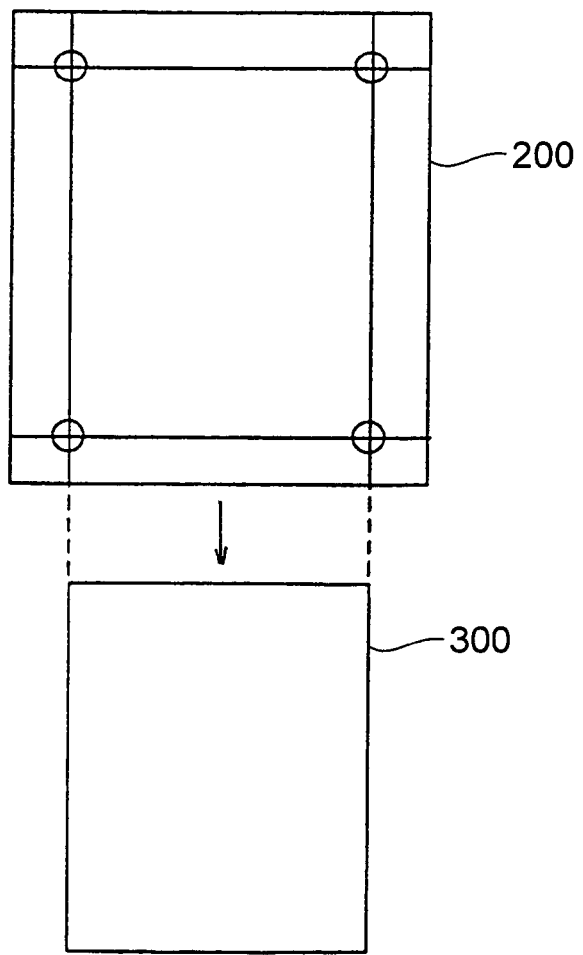

When the inclination correction unit 7 receives the detected inclinations from the angle calculation unit 64, the inclination correction unit 7 corrects the inclination of the input image 100 based on the detected inclinations, and obtains a corrected image 200 as shown in FIG. 10B. For this correction, the inclination correction unit 7 receives the input image 100 from the image data conversion unit 1 before conversion and stores the input image 100 therein (particularly not shown). The input image 100 can be corrected by kinds of processing. For example, a known rotation processing may be used or the processing disclosed in Japanese Patent Laid-Open No. 2002-142084 may be used. The corrected image 200 is stored in a predetermined storage region (not shown).

The image output unit 8 determines four corrected apexes (indicated by white circles) based on the four apexes of the inclined image received from the intersection coordinates calculation unit 63 and the inclinations received from the angle calculation unit 64. The corrected apexes are obtained by operations corresponding to the correction of the inclination of the input image 100. Then, the image output unit 8 extracts (or cuts out) a rectangular image determined by the corrected four apexes (only), and outputs the extracted image as an output image (or cut image) 300.

Figure 11:
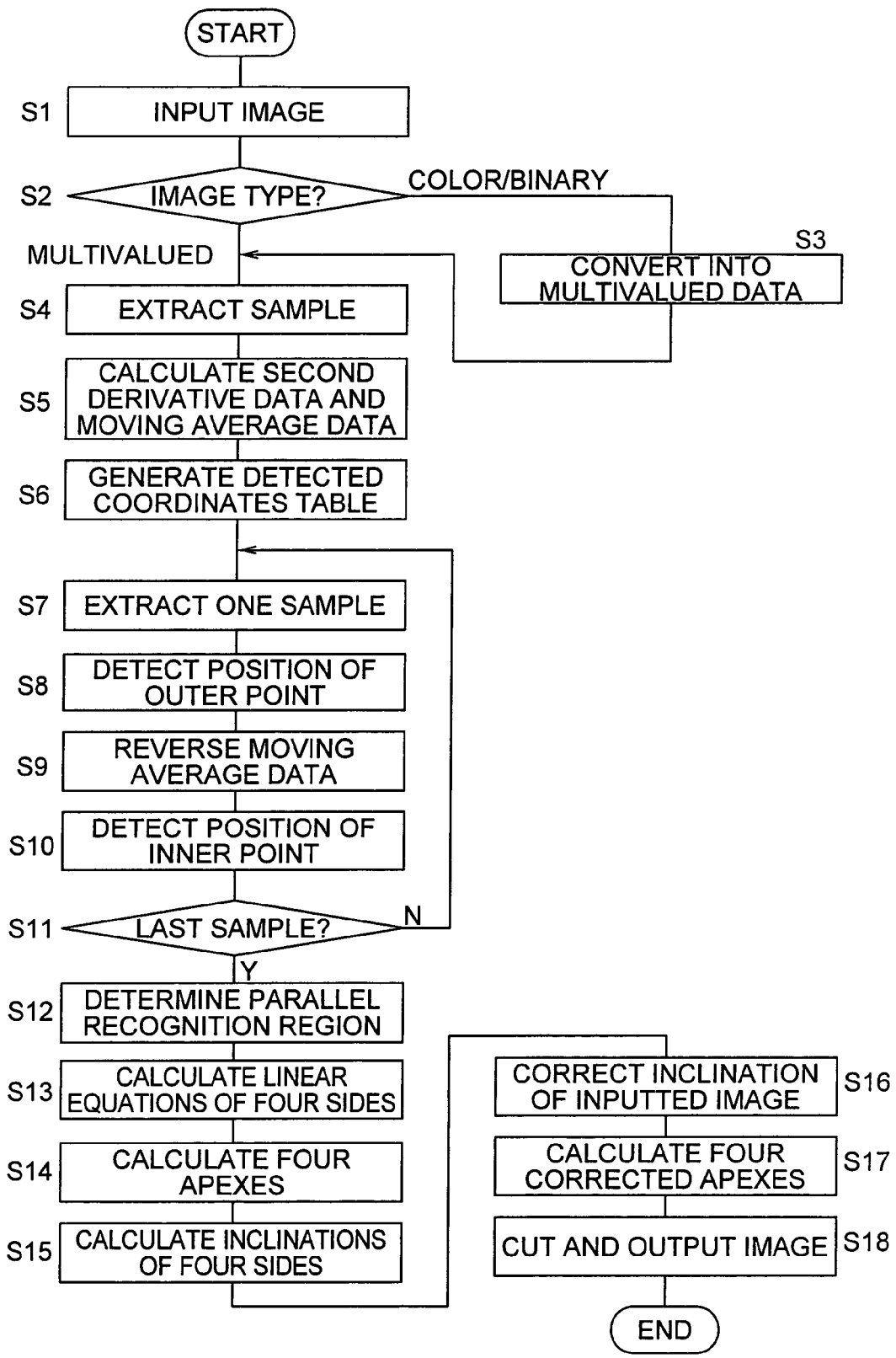
FIG. 11 is a flowchart showing the correction of image inclination in the image reading apparatus of the present invention.

FIG. 11 is a flowchart showing the correction of image inclination in the image reading apparatus of the present invention.

When the input image 100 is inputted (step S1), the image data conversion unit 1 checks the type of the image (step S2). When the image type is a color image or a binary image, the image data conversion unit 1 converts the input image 100 into multivalued image data (step S3), and the processing goes to step S4. When the image type is a multivalued image, the step S3 is skipped. Thereafter, as shown in FIG. 3, the sample extraction unit 2 extracts a plurality of samples in the vertical direction (y direction) and the horizontal direction (x direction) in reading, from the multivalued image data, according to a detection ratio (or extraction ratio) (step S4). Then, as shown in FIGS. 4 and 5, the data calculation unit 3 calculates second derivative data and moving average data for each of the plurality of samples of the vertical direction and the horizontal direction (step S5).

Subsequently, as shown in FIG. 7A, the position detection unit 4 generates the detected coordinates table 421 (step S6), and extracts one of the samples (step S7). As shown in FIG. 6, the position detection unit 4 detects the outer points (the first position $\alpha 0$ and the second position $\beta 0$) at which the second derivative data has the maximum value and has a value larger than the moving average data (step S8), and determines the curve B having a value obtained by reversing the polarity of a value of the moving average data on the point at which the second derivative data has the maximum value (step S9). Thereafter, as shown in FIG. 6, the position detection unit 4 detects the inner points (the first position an and the second position $\beta n$) at which the second derivative data has the minimum value and has a value smaller than a value obtained by reversing the polarity of a value of the moving average data on the point at which the second derivative data has the maximum value (step S10). Then, the position detection unit 4 checks whether the sample is the last one or not (step S11). When the sample is not the last one, the processing in the step S7 and continuous processing thereto are repeated.

Here, in the detection of the outer points and the inner points, it is necessary to first detect the points at which the second derivative data has the maximum value. Therefore, as is understood from FIG. 6, for one sample extracted in the step S7, detection is started from both of the front and rear of a data string which is the sample in the step S8, thereby the outer points or the points at which the second derivative data has the maximum value are detected. Then, in the step S10, the inner points are detected. In fact, detection is started from the front of the sample, for example, then the outer point $\alpha 0$ is detected, and the inner point an is detected in the step S10 after the step S8. The detection in this direction is stopped after the inner point an is detected. Subsequently, detection is started from the rear of the sample, then the outer point $\beta 0$ is detected, and the inner point $\beta n$ is detected in the step S10 after the step S8.

When the sample is the last one, as shown in FIGS. 8 and 9, the parallel region determination unit 5 determines the distribution (or histogram) of distances between the first and second positions for the plurality of samples, and as shown in FIG. 7B, the parallel region determination unit 5 determines the parallel region (parallel recognition region) based on the distribution (step S12).

Then, as shown in FIG. 7C, the inclination detection unit 6 determines the linear equations of the two sides (left side and right side) in the y direction and the linear equations of the two sides (upper side and lower side) in the x direction based on the parallel region (step S13), determines the four apexes of the inclined image based on the intersections by using the linear equations of the four sides (step S14), and determines the inclinations of the four sides of the image based on the four apexes (step S15).

Subsequently, as shown in FIG. 10A, the inclination correction unit 7 corrects the inclination of the input image 100 based on the inclinations, and obtains the corrected image 200 as shown in FIG. 10B (step S16). Then, the image output unit 8 determines the corrected four apexes based on the four apexes and inclination of the inclined image (step S17), cuts out the rectangular image, which is determined by the four corrected apexes, from the corrected image 200 as shown in FIG. 10B, and outputs the cut image as an output image 300 (step S18).

INDUSTRIAL APPLICABILITY

As described above, in the image reading apparatus according to the present invention, a parallel region is determined by using a plurality of samples of multivalued data, the inclinations of the four sides of the image are determined based on the parallel region, and inputted image data is corrected. Thus, even when the input image data is multivalued data or color data, it is possible to correct the inclination of the image data without a conversion into binary data, thereby preventing a deterioration of image quality that is caused by the conversion of image data. Consequently, for example, it is possible to correct the inclination of image data read by a color image scanner without an edit processing such as a rotation processing requiring a long processing time and without a deterioration of image quality.

The invention claimed is:

1. An image reading apparatus, comprising:
    a data calculation unit to calculate moving average data and second derivative data for a plurality of samples made of multivalued data, the plurality of samples being data in a vertical direction and a horizontal direction in reading an inputted image data;
    a position detection unit to detect first and second positions at which the moving average data and second derivative data have a predetermined relationship based on the moving average data and second derivative data, for each of the plurality of samples;
    a parallel region determination unit to determine a parallel region based on the first and second positions detected for each of the plurality of samples;
    an inclination detection unit to determine inclinations of four sides of the inputted image based on the determined parallel region; and
    an inclination detection unit to correct the inputted image data based on the detected inclinations.

2. The image reading apparatus according to claim 1, further comprising:
    a sample extraction unit to extract the plurality of samples in the vertical direction and horizontal direction in reading from the inputted image data.

3. The image reading apparatus according to claim 2, wherein the sample extraction unit determines positions to extract the plurality of samples according to an extraction ratio designated from an outside of the image reading apparatus.

4. The image reading apparatus according to claim 2, further comprising:
    an image data conversion unit to generate multivalued image data based on the inputted image data before the plurality of samples are extracted, when the inputted image data is color image data or binary image data.

5. The image reading apparatus according to claim 1, wherein the position detection unit detects points at which the second derivative data has a maximum value and has a value larger than the moving average data as the first and second positions.

6. The image reading apparatus according to claim 1, wherein the position detection unit detects points at which the second derivative data has a minimum value and has a value smaller than a value obtained by reversing a polarity of a value of the moving average data on a point having the second derivative data of a maximum value, as the first and second positions.

7. The image reading apparatus according to claim 1, wherein the parallel region determination unit determines the parallel region in the vertical direction based on a distribution of a distance between the first and second positions for the plurality of samples in the vertical direction in reading, and determines the parallel region in the horizontal direction based on the distribution of a distance between the first and second positions for the plurality of samples in the horizontal direction in reading.

8. The image reading apparatus according to claim 1, wherein the inclination detection unit determines linear equations of the four sides of the inputted image, determines four apexes based on intersections of the four sides, and determines the inclinations of the four sides.

9. The image reading apparatus according to claim 8, further comprising:
    an image output unit to determine four corrected apexes based on the detected inclinations, extract a rectangular image determined by the corrected apexes, and output the rectangular image.

* * * * *